Patented Dec. 5, 1950

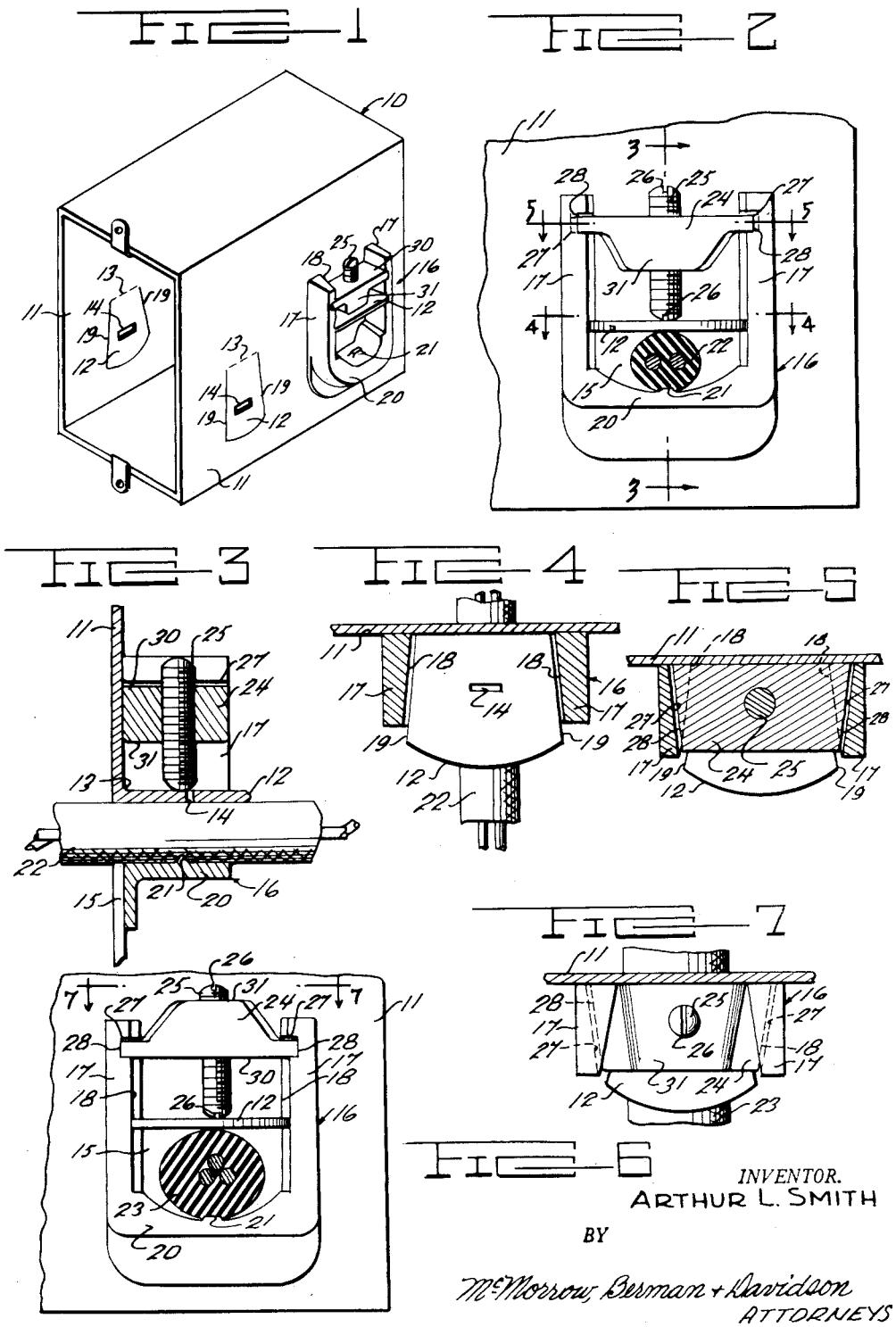

2,532,427

UNITED STATES PATENT OFFICE 2,532,427

ELECTRIC JUNCTION BOX AND THE LIKE AND CABLE CLAMP FOR THE SAME

Arthur L. Smith, Scotch Village, Nova Scotia, Canada

Application January 4, 1949, Serial No. 69,118

10 Claims. (Cl. 285—35.2)

Electric junction boxes and the like, such as switch boxes and electric outlet boxes, are usually formed of sheet metal and provided with one or more knock-outs, which, upon removal provide cable openings through the box walls. Such boxes make no provision for cable clamps adapted to be secured to the boxes for clamping a cable in position while the same is being connected up. Such clamps are not only convenient, but comprise a virtual necessity when the box is located in an inaccessible place whereby to permit the electrician to have both hands free while connecting up the cable. Also, such clamps are extremely useful in relieving the cable connection of strain after the connection is completed.

With the foregoing in view, it is an object of my invention to provide a novel combination of an electric junction box and the like with a cable clamp.

A further object is to provide a novel combined electric outlet box or the like and cable clamp for the same, wherein a knockout or knockouts in the box is, or are, adapted to be laterally directed to provide mounting lugs for a cable clamp located adjacent the opening or openings formed by the knockout.

A further object is to provide a novel electric junction box and the like.

A further object is to provide a novel cable clamp for a junction box or the like.

A further object is to provide a novel combined junction box and cable clamp therefor, wherein a laterally-directed knockout on the box wall provides a cable clamp-mounting lug and also a stationary jaw for the cable clamp.

Other objects and advantages reside in the particular structure of the invention, combination and arrangement of the several parts thereof, and will be readily understood by those skilled in the art upon reference to the attached drawing in connection with the following specification, wherein the invention is shown, described and claimed.

In the drawing:

Figure 1 is a perspective view showing an electric outlet box having the clamp according to the invention applied thereto;

Figure 2 is an enlarged end elevation of the cable clamp showing the same in position on a box wall, a cable clamped by the clamp being shown in cross-section;

Figure 3 is a transverse vertical sectional view taken substantially on the plane of the line 3—3 of Figure 2;

Figure 4 is a horizontal sectional view taken substantially on the plane of the line 4—4 of Figure 2;

Figure 5 is a horizontal sectional view taken substantially on the plane of the line 5—5 of Figure 2;

Figure 6 is a view like Figure 2, but showing certain parts reversed to permit the accommodation of a larger cable in the clamp;

Figure 7 is a plan view taken substantially on the plane of the line 7—7 of Figure 6.

Referring specifically to the drawing, wherein like reference characters have been used throughout the several views to designate like parts, 10 designates generally any suitable electric box, such as the electric outlet or switch box shown, it being understood that the device is equally applicable to electric junction boxes and electric convenience outlet boxes. Such boxes always include side walls formed with knockouts which are generally of circular form and which are adapted to be knocked out of the box as desired to provide cable openings through the walls of the box. However, in the box according to the invention, the side walls 11 are provided with knockouts 12 which are preferably of non-circular form and which, in any event, are integrally connected to the walls 11 along one edge 13 of the knockouts. In the embodiment illustrated, the knockouts 12 are of dovetailed configuration and are provided with the usual slots 14 for the insertion of a screw driver therein for the purpose of bending the knockouts laterally along the hinge-providing edge 13. The knockouts 12 may be bent to extend laterally inwardly of the walls 11 or laterally outwardly as shown in the several views. In any event, the lateral bending of the knockouts 12 provides cable openings 15 through the wall or walls 11.

The laterally-directed knockouts 12 provide lugs for the mounting thereon of the novel clamp now to be described. Thus, the clamp according to the invention comprises a yoke which is generally indicated at 16 and which comprises a pair of legs 17 adapted to be disposed in straddling relation to the lugs or knockouts 12 when the same are laterally bent.

As aforesaid, the lugs or knockouts 12 are of dovetail configuration whereby to provide opposed side edges 19 which converge toward the hinge-providing edge 13. Likewise, it should be noted that the legs 17 of the yoke 16 include inner surfaces 18 which are complementary to the side edges 19 of the lugs 12. Thus, when the yoke is applied over the lug with the legs 17 substantially parallel to the flat surface of the lug, and the yoke is thereafter given a 90° twist as edges of the legs abut the wall 11, the side edges 19 of the lugs will engage the inner surfaces 18 of the legs 17 whereby to prevent withdrawal of the yoke from the lugs in a direction away from the wall 11. The interengaging tongue-and-groove means provided by the edges 19 and surfaces 18 serve to maintain the legs 17 flatly against the box wall 11. The legs 17 are connected together below the lug 12 by a bight 20 providing a movable jaw for the clamp. A central portion of the upper surface of the bight 20 is preferably formed with an upwardly-directed blunt tooth 21 which is adapted to dig into the sheath of a cable 22, Figure 2, or a larger cable 23, Figure 6.

A crosshead 24 spans the legs 17 above the lug 12 and provides a mount for any suitable clamping means 25 which is movable into engagement with the lug 12 whereby to move the yoke 16 so as to bring the bight 20 providing the movable jaw for the clamp into clamping engagement with a cable 22 or 23. In the embodiment illustrated, the clamping or clamp-actuating means 25 comprises a headless screw provided with screw driver slots 26 at either end thereof so that the same is reversible in use for a purpose to be apparent later. Also, I prefer that the crosshead 24 be detachably secured to the legs 17 by means now to be described. Thus, the opposite ends of the crosshead 24 and the inner surfaces of the legs 17 are formed to provide interengaging tongue-and-groove means whereby the crosshead is slidably engageable with the legs 17. In the embodiment illustrated, grooves 27 are formed in the inner surfaces of the legs 17 in opposed relationship. Such grooves 27 have floors which diverge laterally toward the wall 11 of the box. Likewise, the crosshead 24 includes end edges 28 which are complementary to the floors of the grooves 27 to provide a sliding fit therewith. As clearly seen in Figure 5, the dovetail arrangement of the end edges 28 and grooves 27 is the reverse of that provided by the edges 19 and inner surfaces 18 of the legs 17, whereby the grooves 27 are open in effect only on the edges of the legs facing the wall 11. Thus, when the yoke 16 is secured in position on the lug 12, the grooves 27 are closed and the crosshead 24 is positively maintained in position across the legs 17. However, when the yoke 16 is removed from the lug 12, it is a simple matter to slip the crosshead 24 out of the grooves 27 in a well known manner.

To enable the clamp of the invention to accommodate both relatively small cables 22 and larger cables 23, the crosshead 24 is provided with a relatively flat upper surface 30 and a downwardly-offset lower surface 31. In view of the fact that the clamp-actuating means 25 is extensible through either the surface 30 or surface 31 for engagement with the lug 12, I have so constructed the crosshead 24 that it is reversible. Thus, in Figures 1 to 5, inclusive, the flat surface 30 is shown uppermost, whereby the downwardly offset surface 31 is positioned substantially close to the lug 12 to provide substantially little clearance therebetween, whereby the clamp-actuating means 25 must travel but a relatively short distance to engage the lug 12 and actuate the movable jaw 20 of the clamp. However, when it is desired to provide a greater clearance between the crosshead 24 and the lug 12, whereby to permit the movable jaw 20 to drop down lower and provide a relatively larger clamping opening for a cable 23, the crosshead 24 is removed from the yoke 16 and reversed to position the offset surface 31 uppermost, whereby the flat surface 30 provides a relatively greater clearance between the crosshead and the lug 12. Thus, the movable jaw 20 may drop down lower and provide a larger clamping opening between the same and the lug 12.

Although the device is shown as applied to a knockout or lug 12 which is laterally outwardly directed of the wall 11, it is to be understood that it is equally applicable to a lug 12 when the same is laterally inwardly directed of the wall 11. Also, while I have shown and described what is now thought to be a preferred embodiment of the invention, it is to be understood that the same is susceptible of other forms and expressions. Consequently, I do not limit myself to the precise structure shown and described hereinabove except as hereinafter claimed.

I claim:

1. An electric junction box and the like and a cable clamp therefor, said box including a wall having a laterally-directed lug struck from the stock of said wall to provide a cable opening therethrough adjacent said lug, said lug comprising a stationary clamp jaw, a yoke, said yoke including a pair of legs slidably engaging opposite side edges of said lug, a bight connecting said legs together at one end to provide a movable clamp jaw, a crosshead spanning the opposite ends of said legs, actuating means for said movable jaw carried by said crosshead, said actuating means being engageable with said lug to move said yoke relative thereto in a cable-clamping direction.

2. An electric junction box and the like and a cable clamp therefor, said box including a wall having a laterally-directed lug struck from the stock of said wall to provide a cable opening therethrough adjacent said lug, said lug comprising a stationary clamp jaw, a yoke, said yoke including a pair of legs slidably engaging opposite side edges of said lug, said lug and legs being formed with interengaging complementary dovetailed portions operative to maintain said legs flatly against said wall, a bight connecting said legs together at one end to provide a movable clamp jaw, a crosshead spanning the opposite ends of said legs, actuating means for said movable jaw carried by said crosshead, said actuating means being engageable with said lug to move said yoke and bight relative thereto in a cable clamping direction.

3. An electric junction box and the like and a cable clamp therefor, said box including a wall having a laterally-directed lug struck from the stock of said wall to provide a cable opening therethrough adjacent said lug, said lug comprising a stationary clamp jaw, a yoke, said yoke including a pair of legs slidably engaging opposite side edges of said lug, a bight connecting said legs together at one end to provide a movable clamp jaw, said legs including opposite ends having inner surfaces formed with facing grooves, a crosshead slidably seated in said grooves and spanning said legs on the opposite side of said lug from said bight, actuating means for said movable jaw carried by said crosshead, said actuating means being engageable with said lug to move said yoke and bight relative thereto in a cable-clamping direction, and said yoke and lug including interengaging means for maintaining said yoke on said lug with said legs flatly engaging said wall.

4. An electric junction box and the like and a cable clamp therefor, said box including a wall having a laterally-directed lug struck from the stock of said wall to provide a cable opening therethrough adjacent said lug, said lug comprising a stationary clamp jaw, a yoke, said yoke including a pair of legs slidably engaging opposite side edges of said lug, a bight connecting said legs together at one end to provide a movable clamp jaw, said legs including opposite ends having inner surfaces formed with facing grooves, a crosshead slidably seated in said grooves, said grooves being open at the ends thereof adjacent said box wall to permit the insertion and removal of said crosshead prior to the mounting of said yoke on said lug, said open ends of said grooves being closed by said box wall with said yoke mounted on said lug whereby to retain said crosshead in said grooves, said yoke and lug being formed with interengaging means for retaining said yoke on said lug with said legs flatly engaging said wall of said box, actuating means for said movable jaw carried by said crosshead, said actuating means being engageable with said lug to move said yoke and bight relative thereto in a cable-clamping direction.

5. An electric junction box and the like and a cable clamp therefor, said box including a wall having a laterally-directed lug struck from the stock of said wall to provide a cable opening therethrough adjacent said lug, said lug comprising a stationary clamp jaw, a yoke, said yoke including a pair of legs slidably engaging opposite side edges of said lug, said lug and legs being formed with interengaging complementary dovetailed portions operative to maintain said legs flatly against said wall, a bight connecting said legs together at one end to provide a movable clamp jaw, said legs including opposite ends having inner surfaces formed with facing grooves, a crosshead slidably seated in said grooves, said grooves being open at the ends thereof adjacent said box wall to permit insertion and removal of said crosshead prior to the mounting of said yoke on said lug, said open ends of said grooves being closed by said box wall with said yoke mounted on said lug, whereby to retain said crosshead in said grooves, actuating means for said movable jaw carried by said crosshead, said actuating means being engageable with said lug to move said yoke and bight relative thereto in a cable-clamping direction.

6. An electric junction box and the like and a cable clamp therefor, said box including a wall having a laterally-directed lug struck from the stock of said wall to provide a cable opening therethrough adjacent said lug, said lug comprising a stationary clamp jaw, a yoke, said yoke including a pair of legs slidably engaging opposite side edges of said lug, a bight connecting said legs together at one end to provide a movable clamp jaw, said legs including opposite ends having inner surfaces formed with facing grooves, a crosshead slidably seated in said grooves and spanning said legs on the opposite side of said lug from said bight, actuating means for said movable jaw carried by said crosshead, said actuating means being engageable with said lug to move said yoke and bight relative thereto in a cable-clamping direction, said yoke and lug including interengaging means for maintaining said yoke on said lug with said legs flatly engaging said wall, said crosshead having a flat upper surface and a downwardly-offset lower surface, said actuating means for said movable jaw being operative from either surface of said crosshead, and said crosshead being reversible to position said lower surface uppermost and provide a larger clearance between said crosshead and lug whereby to adapt said clamp to cables of larger size.

7. A cable clamp for an electric junction box and the like, comprising a yoke including spaced legs, a bight connecting said legs together at one end, said legs including free ends formed with opposed grooves, a crosshead slidable in said grooves to span said free ends of said legs, and a clamping screw threaded in said crosshead for clamping movement relative to said crosshead toward said bight.

8. In an electric junction box and cable clamp therefor, said box including a wall being provided with an aperture for the extension and withdrawal of a cable therethrough, a lug extending outwardly from said wall adjacent one side of said opening and fixedly secured to said wall, a movable jaw positioned adjacent the other side of said opening and mounted on said lug for movement into and out of embracing engagement with said cable, and means rotatably supported in said jaw and engageable with said lug for effecting the movement of said movable jaw.

9. In an electric junction box and cable clamp therefor, said box including a wall being provided with an aperture for the extension and withdrawal of a cable therethrough, a lug extending outwardly from said wall adjacent one side of said opening and fixedly secured to said wall, a movable jaw positioned adjacent the other side of said opening and mounted on said lug for movement into and out of embracing engagement with said cable, a cross head positioned in spaced relation with respect to said lug and operatively connected to said movable jaw, and means rotatably supported in said cross head and engageable with said lug for effecting said movement of said movable jaw.

10. A cable clamp for an electrical junction box comprising, a U-shaped yoke, a cross head arranged intermediate the legs of said yoke and fixedly secured thereto, and clamp means carried by said cross head and mounted in the latter for movement toward the bight of said yoke.

ARTHUR L. SMITH.

REFERENCES CITED

The following references are of record in the file of this patent:

UNITED STATES PATENTS

| Number | Name | Date |
| --- | --- | --- |
| 767,163 | Neuberth | Aug. 9, 1904 |